(12) United States Patent
Ohashi et al.

(10) Patent No.: US 7,676,029 B2
(45) Date of Patent: Mar. 9, 2010

(54) GUIDANCE APPARATUS RELATED TO OPERATION OF INFORMATION EQUIPMENT AND GUIDANCE METHOD RELATED TO OPERATION OF INFORMATION EQUIPMENT

(75) Inventors: Takayuki Ohashi, Kawasaki (JP); Ryu Shibata, Yokohama (JP); Kazunari Kawai, Yokohama (JP); Shoichiro Nakae, Yokohama (JP); Masafumi Katsumata, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 986 days.

(21) Appl. No.: 11/389,142

(22) Filed: Mar. 27, 2006

(65) Prior Publication Data
US 2007/0143476 A1    Jun. 21, 2007

(30) Foreign Application Priority Data
Dec. 16, 2005    (JP)    ............................. 2005-362910

(51) Int. Cl.
*H04M 11/00* (2006.01)
*G06F 15/173* (2006.01)
(52) U.S. Cl. .............. 379/90.01; 379/93.17; 379/93.25; 715/700
(58) Field of Classification Search .............. 379/90.01, 379/93.05, 93.06, 93.17, 93.25; 709/204, 709/205, 208, 217, 220–222; 715/700

See application file for complete search history.

(56) References Cited

FOREIGN PATENT DOCUMENTS

| JP | 2004-185389 | 7/2004 |
|----|-------------|--------|
| JP | 2004-310515 | 11/2004 |
| WO | WO 98/13773 | 4/1998 |

OTHER PUBLICATIONS

Office Action dated May 9, 2008 in corresponding Chinese Patent Application No. 200610076481.X (16 pages including translation).

*Primary Examiner*—Melur Ramakrishnaiah

(57) ABSTRACT

To provide a technology indicating guidance for a usage method of information equipment and for solving an abnormality of the information equipment to not only users having knowledge about terminology of the information equipment but also users having none of the knowledge about the terminology of the information equipment.

A guidance apparatus receives identifying information of information equipment from a device, reads an image from a database containing images about the information equipment with respect to the received identifying information, creates guidance information containing the read image, transmits the created guidance information to the device, receives information determined by a manipulation about the guidance information on the device, and controls so as to read the image used next for the guidance information from the received information.

10 Claims, 12 Drawing Sheets

GUIDANCE APPARATUS RELATED TO OPERATION OF INFORMATION EQUIPMENT AND GUIDANCE METHOD RELATED TO OPERATION OF INFORMATION EQUIPMENT

BACKGROUND OF THE INVENTION

1. Field of the Invention

The present invention relates to a guidance apparatus related to an operation of information equipment, and a guidance method related to the operation of the information equipment.

2. Description of the Related Art

At the present, information equipment such as a PC (Personal Computer), a PDA (Personal Digital Assistant) and a mobile phone (cell phone) is utilized in broad applications. A user of the information equipment might get confused with a usage method of the information equipment because of having broad usage modes. Further, it happens that the user of the information equipment is unable to solve a variety of unexpected abnormalities (troubles) of the information equipment. At the present, on the PC categorized as one of the information equipment, a Web content for supporting the PC is provided on the Internet in order to present a PC usage method and to solve the abnormality. Then, the user can scheme to solve (troubleshoot) the problem (trouble) by utilizing the guidance based on the Web content for the PC support. The Web content for the PC support has, however, a tremendous data size because of the broad usage modes of the PC. Therefore, the Web content for the PC support in the related arts involves utilizing display of a list of PC usage methods, a list of abnormality solutions and a search by a keyword based on PC-related terminology in order for the user to readily search for a target content. Moreover, such a technology is also employed that lists of contents (usage methods, solutions, etc) sorted out according to categories are displayed on the occasion of displaying those lists.

Considered is such a case that the user having none of the knowledge of the terminology of the PC utilizes the guidance, based on the Web content for the PC support in the related art, for the PC usage method and for solving the abnormality of the PC. Examples of this case will hereinafter be described with reference to FIGS. 12 and 13.

FIG. 12 shows a first example of utilizing the Web content for the PC support in the related art. FIG. 12 is a diagram showing a case where the PC of the user accesses (links to) the Web content for the PC support in the related art. FIG. 12 illustrates, by way of the example, a case where the user checks a cause by which the abnormality (failure; trouble) occurs in the operation of the PC and tries to solve the abnormality. FIG. 12 shows a state in which the PC of the user accesses "Website" of the Web content for the PC support. Then, in FIG. 12, a list of troubles is displayed under a string of characters such as "<Get troubleshooting here!>".

In the case of the user having the knowledge about the PC's terminology, as shown in FIG. 12, the user understands the PC's technical terms such as "startup", "unstable operation", "screen" and so on. Then, the user selects a proper content corresponding to each of the numbers of 2 through 6 shown in FIG. 12, whereby a target Web content (content) can be displayed on the screen of the PC employed by the user.

In the case of the user having none of the knowledge about the PC's terminology, however, as shown in FIG. 12, the user does not understand the PC's technical terms such as "startup", "unstable operation", "screen" and so on. Accordingly, the user is unable to select the proper content corresponding to each of the numbers of 2 through 6 shown in FIG. 12. Hence, the user gets into such a state that the user can not judge which content meets the user's own object. Thus, the user can not solve even the problem (trouble) which can be solved by this Web content if the user has the knowledge about the PC's terminology. Therefore, it follows that the user gives up the self-solution and utilizes telephone support and so forth.

Considered further is a case of utilizing a technology, as the related art, of using the display of a list of support contents sorted out according to categories on the occasion of displaying the list of the support content. In this case also, the user having none of the knowledge about the PC's terminology does not understand the category to which a necessary item of information belongs. Hence, as shown in FIG. 12, it is considered that the user is unable to solve the problem by himself or herself.

FIG. 13 shows a second example of utilizing the Web content for the PC support in the related art. A difference from FIG. 12 lies in a point that the user can access the information by a keyword search. To be specific, FIG. 13 shows that a string of characters such as "Please do search by inputting keyword. Introduce solutions." is displayed under a string of characters such as "<Get troubleshooting here!>". Further, FIG. 13 shows a Web content (keyword search) set so that the user inputs a term of the PC under the string of characters and presses a "search" button. The user presses the button, whereby the server extracts a target Web content by use of a search DB (Database) linking to the server. Then, the server displays the target Web content on the screen of the PC employed by the user.

In the case of the user having the knowledge about the PC's terminology, as shown in FIG. 13, the user understands a proper PC's technical term related to a solution of the problem which the user has. Accordingly, the user searches for a proper technical term of the PC by the keyword search, whereby the target Web content can be displayed on the screen of the PC employed by the user.

In the case of the user having none of the knowledge about the PC's terminology, however, as shown in FIG. 13, the user does not understand the proper PC's technical term related to the solution of the problem which the user has. Hence, the user does not hit on any should-be-inputted technical term of the PC and gets into an unable-to-search state. Accordingly, the user can not solve even the problem that can be solved by utilizing the Web content for the PC support. Hence, the user gives up the self-solution and utilizes telephone support and so forth.

As exemplified so far with reference to FIGS. 12 and 13, the problem is that the user having none of the knowledge about the PC's terminology can not utilize the service for providing the Web content for the PC support in the related art, such as utilizing the PC usage method, displaying the list of the abnormalities of the PC and the keyword search using the technical terms of the PC.

The followings are related arts to the present invention.
[Patent document 1] Japanese Patent Application Laid-Open Publication No. 2004-185389
[Patent document 2] Japanese Patent Application Laid-Open Publication No. 2004-310515

SUMMARY OF THE INVENTION

The present application is made in view of the problems inherent in the related arts. Namely, it is an object of the present invention to provide a technology of presenting guidance indicating guidance for a usage method of information equipment and for solving an abnormality of the information equipment to not only users having knowledge about terminology of the information equipment but also users having none of the knowledge about the terminology of the information equipment.

The present invention adopts the following means in order to solve the problems.

(1) Namely, a guidance apparatus according to the present invention is a guidance apparatus related to an operation of information equipment, providing guidance information on operations of the information equipment by performing mutual communications with a device, the guidance apparatus comprising a database containing images about the information equipment, an identifying information receiving unit receiving the identifying information of the information equipment from the device, an image information reading unit reading the image from the database with respect to the identifying information received by the identifying information receiving unit, a creating unit creating guidance information containing the image read by the image information reading unit, a transmitting unit transmitting the guidance information created by the creating unit to the device, an image designation receiving unit receiving information determined by a manipulation about the guidance information on the device, and a control unit controlling the image information reading unit to read the image used for the guidance information to be created next by the creating unit from the information received by the image designation receiving unit.

With this configuration, the guidance apparatus performs the mutual communications with the device employed by a user. The guidance apparatus provides the guidance information related to the operation of the information equipment such as a PC, a PDA, a mobile phone, etc. The database related to the guidance apparatus contains the images concerning the information equipment. The guidance apparatus receives the identifying information of the information equipment from the device, reads the image from the database with respect to the received identifying information, creates the guidance information containing the read image, transmits the created guidance information to the device, receives information determined by a manipulation about the guidance information on the device, and controls the guidance apparatus itself so as to read the image used for the guidance information created next from the received information. Accordingly, the guidance apparatus can provide the device with the guidance information containing the images of the information equipment. When the device manipulates the guidance information, the guidance apparatus can provide the device with the guidance information corresponding to the manipulation of the device.

(2) Further, in the guidance apparatus according to the present invention, the guidance information may further contain coordinates defined within the image and next image information that designates an image to be displayed next on the device when manipulating an image portion containing the defined coordinates, and the information received by the image designation receiving unit may be information on the next image contained in the guidance information.

With this configuration, the guidance information related to the guidance apparatus may further contain the coordinates defined within the image and the next image information that designates the image to be displayed next on the device when manipulating the image portion containing the defined coordinates. Moreover, the information received by the guidance apparatus may be the next image information contained in the guidance information. Accordingly, the guidance apparatus can receive, from the device, the information of the image to be displayed next on the device that is designated by the user of the device, corresponding to the defined coordinates.

(3) Furthermore, in the guidance apparatus according to the present invention, the information received by the image designation receiving unit may be coordinates indicating a position within the image, the database may contain coordinate information that associates the coordinates defined within the image with the next image information that designates the image to be displayed next on the device, and the guidance apparatus may further comprise a next image determining unit determining the image to be displayed next on the device from the coordinate information on the basis of the coordinates received by the image designation receiving unit.

With this configuration, the information received from the device by the guidance apparatus may be the coordinates indicating the position within the image. Moreover, the database related to the guidance apparatus may contain the coordinate formation that associates the coordinates defined within the image with the information of the image to be displayed next on the device. Still further, the guidance apparatus, when receiving the coordinates from the device, reads the coordinate information from the database, and can determine the information of the image to be displayed next from the coordinates and the coordinate information.

(4) Yet further, in the guidance apparatus according to the present invention, the database may further contain an image for emphasizing a portion about which a query is given to a support center accepting the query from the user, and coordinates for disposing the portion, and the guidance apparatus may further comprise a judging unit judging based on the database whether or not the guidance information created by the creating unit contains the portion about which the query is given, and an emphasizing unit reading, when the judging unit judges that there exists the portion, the image for emphasizing the portion and the coordinates for disposing the portion from the database, and making the guidance information created by the creating unit contain the thus-read image for emphasizing and the thus-read coordinates for disposing.

With this configuration, the database related to the guidance apparatus may further contain the image for emphasizing the portion about which the query is given to the support center accepting the query from the user, and coordinates for disposing the portion. Moreover, the guidance apparatus may judge based on the database whether or not the created guidance information contains the portion about which the query is made, then, when judging that this portion exists, may read from the database the image for emphasizing this portion and the coordinates for disposing this portion, and may make the created guidance information contain the thus-read image for emphasizing and the thus-read coordinates for disposing. Hence, the guidance apparatus can emphasize the portion about which the query is given to the support center accepting the query from the user by disposing the image in the guidance information.

(5) Yet further, in the guidance apparatus according to the present invention, the portion about which the query is given may be the portion about which the user of the device queries.

With this configuration, the guidance apparatus can emphasize the portion about which the user of the device queries the support center accepting the query from the user by disposing the image in the guidance information.

(6) Moreover, in the guidance apparatus according to the present invention, the portion about which the query is given may be a portion about which users other than the user of the device and the user of device query a predetermined or larger number of times.

With this configuration, the guidance apparatus can emphasize portion about which users other than the user of the device and the user of the device query a predetermined or larger number of times the support center accepting the query from the user by disposing the image in the guidance information.

(7) Furthermore, in the guidance apparatus according to the present invention, the image related to the information equipment may contain an image about an external configuration of the information equipment and an explanatory image about the external configuration of the information equipment, or an image of a screen displayed on a display when operating the information equipment and an explanatory image about the screen displayed on the display when operating the information equipment.

With this configuration, the guidance apparatus can use, as the image used in the guidance information, the image about the external configuration of the information equipment and the explanatory image about the external configuration of the information equipment, or the image of the screen displayed on the display when operating the information equipment and the explanatory image about the screen displayed on the display when operating the information equipment.

(8) Still moreover, in the guidance apparatus according to the present invention, the image related to the information equipment may contain guidance for a usage method of the information equipment and guidance for obviating an abnormality of the information equipment, or may contain images about the guidance for the usage method of the information equipment and the guidance for obviating the abnormality of the information equipment.

With this configuration, the guidance apparatus can use, as the image used in the guidance information, the guidance for the usage method of the information equipment and the guidance for obviating the abnormality of the information equipment, or can use the images about the guidance for the usage method of the information equipment and the guidance for obviating the abnormality of the information equipment.

Further, the present invention may be, in the guidance apparatus related to the operation of the information equipment, a method of executing the processes given above or a program for making a central processing unit execute the processes.

According to the present invention, it is possible to indicate the guidance for the usage method of the information equipment and for solving the abnormality of the information equipment to not only the users having the knowledge about the terminology of the information equipment but also the users having none of the terminology of the information equipment.

DETAILED DESCRIPTION OF THE PREFERRED EMBODIMENT

An embodiment of the present invention will hereinafter be described with reference to the drawings. A configuration in the following embodiment is an exemplification, and the present invention is not limited to the configuration in the embodiment.

Embodiment

Figure 1:
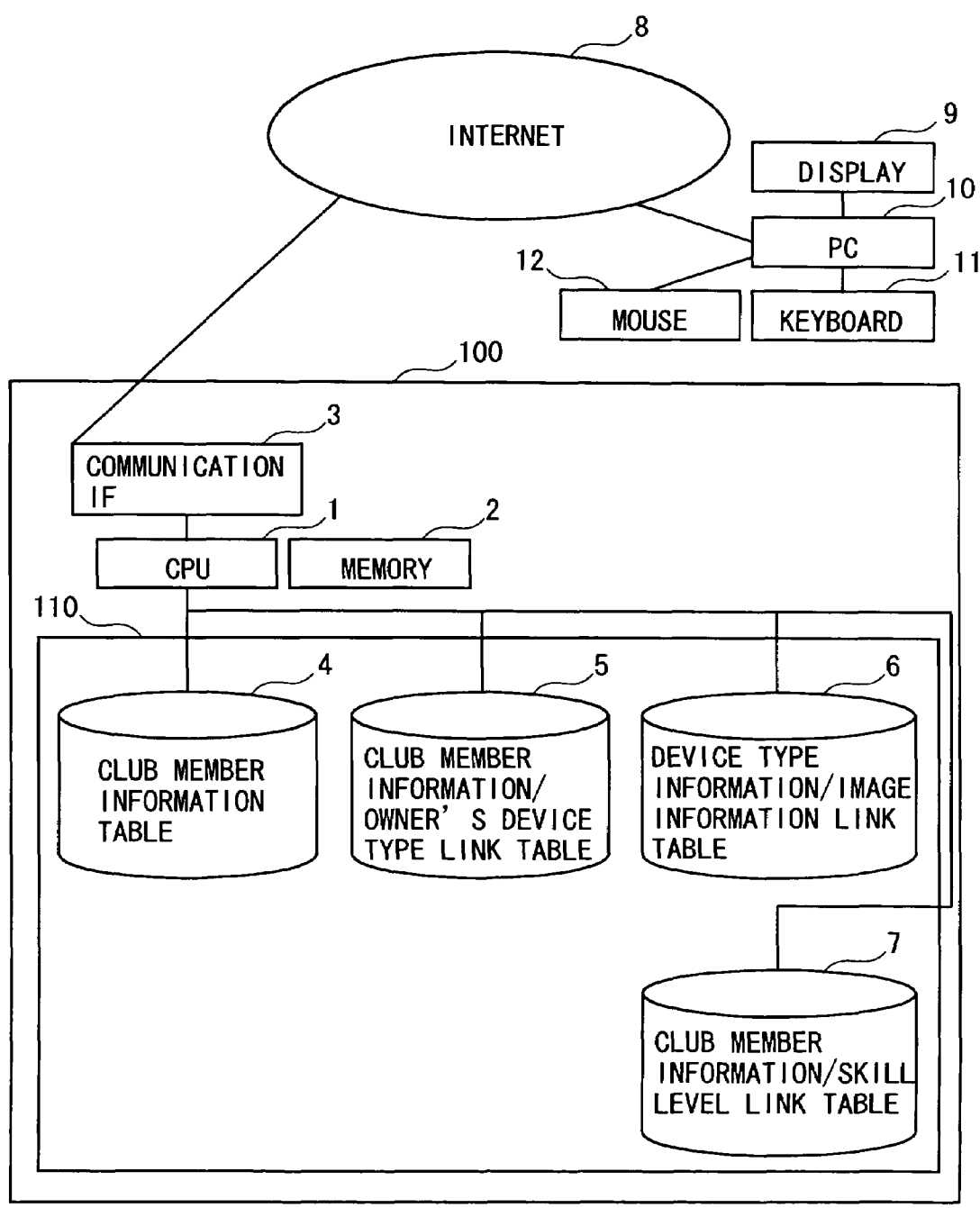
FIG. 1 is a diagram showing a basic structure of a communication system according to an embodiment of the present invention.

A communication system according to an embodiment of the present invention will be explained with reference to the drawings in FIGS. 1 and 2. FIG. 1 is a diagram of a basic structure of the communication system according to the embodiment. This communication system includes a server 100 (corresponding to a "guidance apparatus" according to the present invention), and a PC 10 capable of transmitting and receiving data (information) via the Internet 8 to and from the server 100. The PC 10 includes a display 9, a keyboard 11 and a mouse 12. The server 100 has a CPU 1, a memory 2 connected to the CPU 1, a communication IF (Interface) 3 connected to the CPU 1, and a hard disc 110 connected to the CPU 1. Further, the hard disc 110 is stored with a club member information table 4, a club member information/owner's device type link table 5, a device type information/image information link table 6 and a club member information/skill-level link table 7. Moreover, the display 9, the PC 10, the keyboard 11 and the mouse 12 may not be the individual devices as shown in FIG. 1 but may also be an integral type of device (system) such as a notebook type personal computer.

The CPU 1 processes the information by executing a program preinstalled in the memory 2. The memory 2 is used for storing temporary data on such an occasion that the CPU 1 processes the data. The hard disc 110 is preinstalled with a program employed for the CPU 1 to process the data. Further, the hard disc 110 is stored with a PC usage method and information used for guidance for an abnormality solution (troubleshooting) of the PC. The communication IF 3 is used for executing data communications between the CPU 1 and the PC 10 via the Internet 8.

With this configuration, the CPU 1 transmits information (corresponding to "guidance information" according to the present invention) for displaying a WWW (World Wide Web) content (support page) to the PC 10 via the communication IF 3. The CPU 1 receives the information via the communication IF 3. This information is data (information) inputted from the keyboard 11 or the mouse 12 connected to the PC 10, which is, e.g., information on a user's membership ID etc. The CPU 1 reads and writes the information from and to the memory 2, the hard disc 110 and the tables such as the club member information table 4, the club member information/owner's device type link table 5, the device type information/image information link table 6 and the club member information/ skill-level link table 7 that are stored on the hard disc 110.

The PC 10 is connectable to the Internet 8 and performs the communications with the server 100 via the Internet 8. The PC 10 receives the data containing the WWW content (Web content) from the server 100 via the Internet 8. The PC 10 includes an application (Browser) for having the WWW content displayed. The PC 10, when receiving the data from the server 100, displays the Web content on the display 9 by making use of the Browser. The PC 10 receives an input from the keyboard 11 or the mouse 12. The PC 10 transmits the data inputted from the keyboard 11 or the mouse 12 to the server 100 via the Internet 8. With this configuration employed, the user accesses the server 100 via the PC 10.

<Structure of Database>

Figure 2:
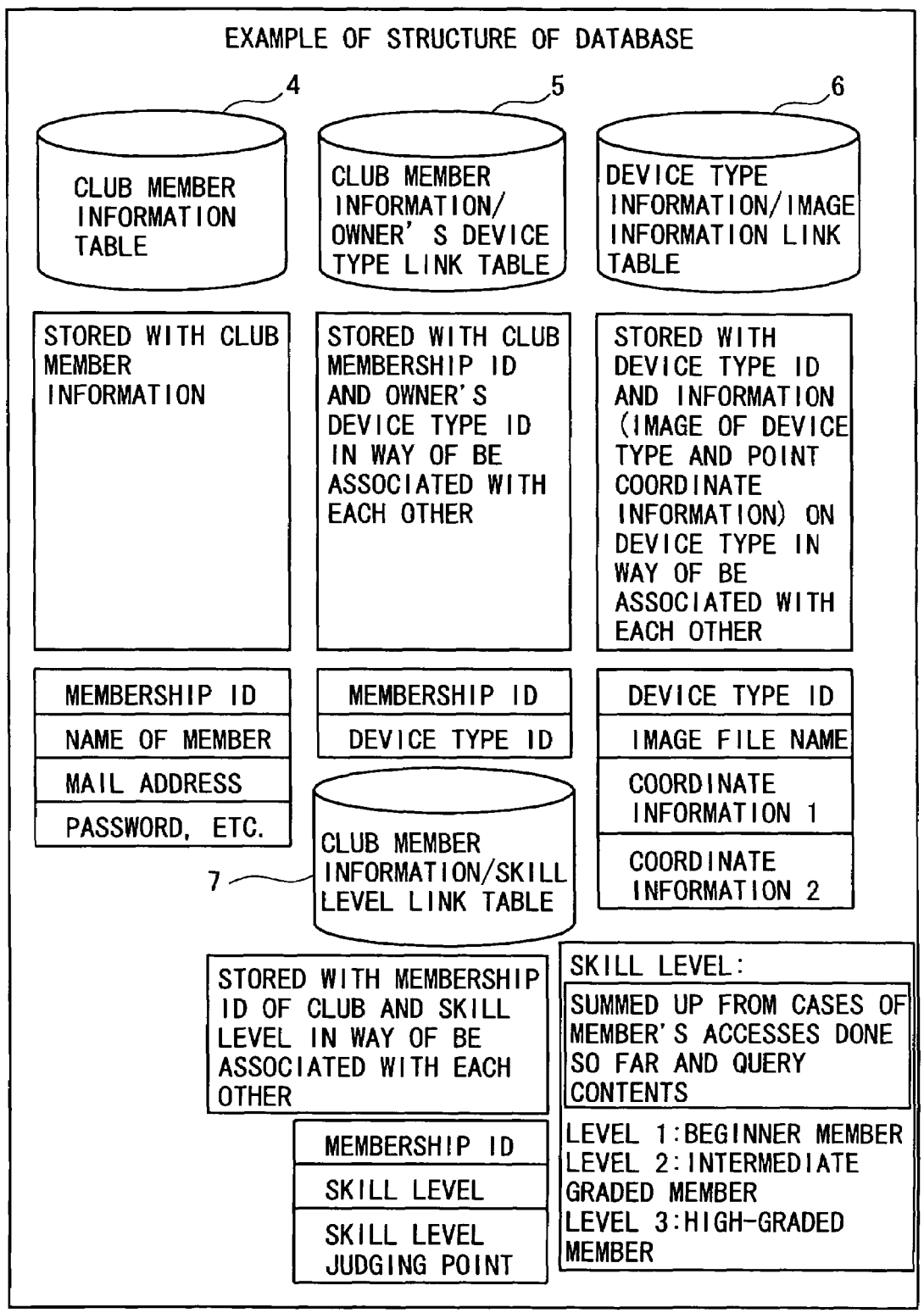
FIG. 2 is a diagram showing an example of a structure of a database provided in a server according to the embodiment of the present invention.

FIG. 2 is a diagram showing an example of data structures of the club member information table 4, the club member information/owner's device type link table 5, the device type information/image information link table 6 and the club member information/skill-level link table 7 that are stored on the hard disc 110 (corresponding to a "database" according to the present invention).

The club member information table 4 is stored with a membership ID, a member name, a mail address, a password, etc. The club member information/owner's device type link table 5 is stored with a membership ID and an owner's device type ID. The device type information/image information link table 6 is stored with a device type ID, an image file name, coordinate information 1 and coordinate information 2. The club member information/skill-level link table 7 is stored with a club membership ID, a skill level and a skill level judging point that are associated with each other.

The CPU 1 authenticates the user by use of the membership ID and the password given from the PC 10 and thereafter reads the member name, the mail address, etc from the club member information table 4. The CPU 1 reads the device type ID associated with the membership ID from the club member information/owner's device type link table 5 by use of the membership ID given from the PC 10. The CPU 1, if the PC 10 does not retain the membership ID, receives information about the device type from the PC 10 and, based on this information, reads the device type ID by employing the memory 2. The CPU 1 reads the device ID, an image file related to the device type associated with this device type ID, the coordinate information 1 and the coordinate information 2 from the device type information/image information link table 6 by use of the device type ID (as a search key).

The device type ID is set corresponding to a device type of the PC. The image file contains images such as an external configuration etc of the PC but is different depending on the device type of the PC. In a case where the images contain a desktop screen and a peripheral device as an option, it follows that the images differ due to occurrence of an option-added state in a PC setting state even if the device type is the same. Such being the case, the image is an image related to the PC in the setting at a stage where the PC corresponding to the device type ID arrives at a user's hand for the first time, i.e., at a delivery stage of a maker. The image file contains an image about the external configuration of the PC and an explanatory image about the external configuration of the PC, or an image of a screen displayed on the display when operating the PC and an explanatory image of the screen displayed on the display when operating the PC. The explanatory image about the external configuration of the PC represents explanations of terminals to, e.g., a power switch and a peripheral device. The explanatory image of the screen displayed on the display when operating the PC represents explanations of icons. Further, the image file contains images related to the PC usage method and guidance for obviating the abnormality of the PC. Moreover, the image file contains images related to guidance for the PC usage method, or the guidance for obviating the abnormality of the PC. Still further, the image file differing on a guidance-by-guidance basis may also be stored as the image file on the hard disc 110. In this case, the CPU 1 employs these image files according to every guidance.

The coordinate information 1 and the coordinate information 2 are information used for the user of the PC 10 to designate a partial area. The coordinate information contains coordinates of a vertex of a polygon as information for judging the partial area selected by the user. Then, the CPU 1 judges which partial area is designated by knowing whether or not the coordinates designated by the keyboard 11 or the mouse 12 are contained in an area specified by the coordinates for designating the partial area. Further, the coordinate information contains a name of an image file to be displayed next corresponding to the partial area when this partial area is designated. Accordingly, the coordinate information contains the information related to the judgment of the partial area and information of the image displayed next corresponding to the thus-judged partial area.

The coordinate information 1 is used when judging whether some of the images on the screen displayed on the displayed when operating the PC or some of the explanatory images about the screen displayed on the displayed when operating the PC, are manipulated or not. The coordinate information 2 is employed when judging whether some of the images related to the external configuration of the PC or some of the explanatory images related to the external configuration of the PC, are manipulated or not.

The coordinate information 1 is used when judging whether some of the images on the screen displayed on the displayed when operating the PC or some of the explanatory images about the screen displayed on the displayed when operating the PC, are manipulated or not. The coordinate information 2 is employed when judging whether some of the images related to the external configuration of the PC or some of the explanatory images related to the external configuration of the PC, are manipulated or not. The coordinate information 1 and the coordinate information 2 are used in the Web content (corresponding to "guidance information" according to the present invention) shown to the user. The coordinate information 1 and the coordinate information 2 are used, in this Web content, for judging the partial area within the image designated by the user. The coordinate information 1 and the coordinate information 2 contain a file name of the image displayed next corresponding to the partial area within the image designated by the user. Then, the PC 10 receives the manipulation about part of the image attached with the coordinate information 1 or the coordinate information 2 in the Web content. Thereupon, the PC 10 detects this manipulation and transmits the image file name corresponding to the designated partial area to the server 100.

Further, another usage of the coordinate information 1 and the coordinate information 2 is that the server 100 may receive the coordinates designated by the user in the Web content from the PC 10. In this case, the server 100 judges the partial area corresponding to the designated coordinates by use of the coordinate information 1 or the coordinate information 2 with respect to the received coordinates. Then, the server 100 acquires the file name of the image displayed next by the PC 10, which corresponds to the judged partial area.

The device type information/image information link table 6 may be stored with a flag (this flag shows 1 when a query about a certain image is given and 0 when no query is given) showing whether a predetermined or larger number of users queried a support center (unillustrated) about individual portions of the PC, a device type ID, an image file for emphasizing the queried portion (or a file name of the image file) and coordinates for designating the queried portion. Moreover, the device type information/image information link table 6 may also be stored with an image surrounding the queried portion and an arrowhead image pointing the queried portion as the image file for emphasizing the queried portion. Still further, the device type information/image information link table 6 may also be stored with the flag, the device type ID, the image file (or the file name of the image file) and a label of the coordinates in which the image file is disposed in a way that associates these items with each other.

<Skill Level>

The skill level is categorized into three levels such as a beginner member, an intermediate-grade member and a high-grade member, wherein the beginner member is assigned a level 1, the intermediate-grade member is assigned a level 2, and the high-grade member is assigned a level 3. These skill levels are determined based on an access count in which the club member accesses the communication system and a query content with which the user queries the support center (unillustrated).

Given next is an example where the CPU 1 of the server 100 determines the skill level. The skill level differs depending on the membership ID. The CPU 1 uses the skill level judging point stored in the club member information/skill-level link table 7 in order to determine the skill level. Each membership ID is pre-stored with a point "0" as the skill level judging point. This point is contrived such that when the user accesses predetermined coordinate information, the point preset in the coordinate information is added to the skill level judging point. The point to be added ranges from a point "−10" to a point "+10". The CPU 1, during the user's access to the communication system, detects an adding state of this skill level judging point. Then, the CPU 1, when the skill level judging point is added, overwrites the post-adding skill level judging point to the pre-adding skill level judging point in the club member information/skill-level link table 7. A point ranging from −10 to +10 is preset also in the query content. When making the query, the point preset in the query content is added to the skill level judging point, and the added point is overwritten on the hard disc 110.

If the skill level judging point of the user is between the point "−10" and the point "10", the CPU 1 judges the user to be the intermediate-grade member and assigns the level 2 as the user's skill level. The CPU 1, when the skill level judging point of the user is equal to or higher than the point "10", judges the user to be the beginner member and assigns the level 1 as the user's skill level. The CPU 1, when the skill level judging point of the user is equal to or lower than the point "−10", judges the user to be the high-grade member and assigns the level 3 as the user's skill level.

Working Example

An operation of the server having a support function according to a working example of the present invention will hereinafter be described with reference to FIGS. 3 through 11.

<First Flowchart Showing Processes of Server>

Figure 3:
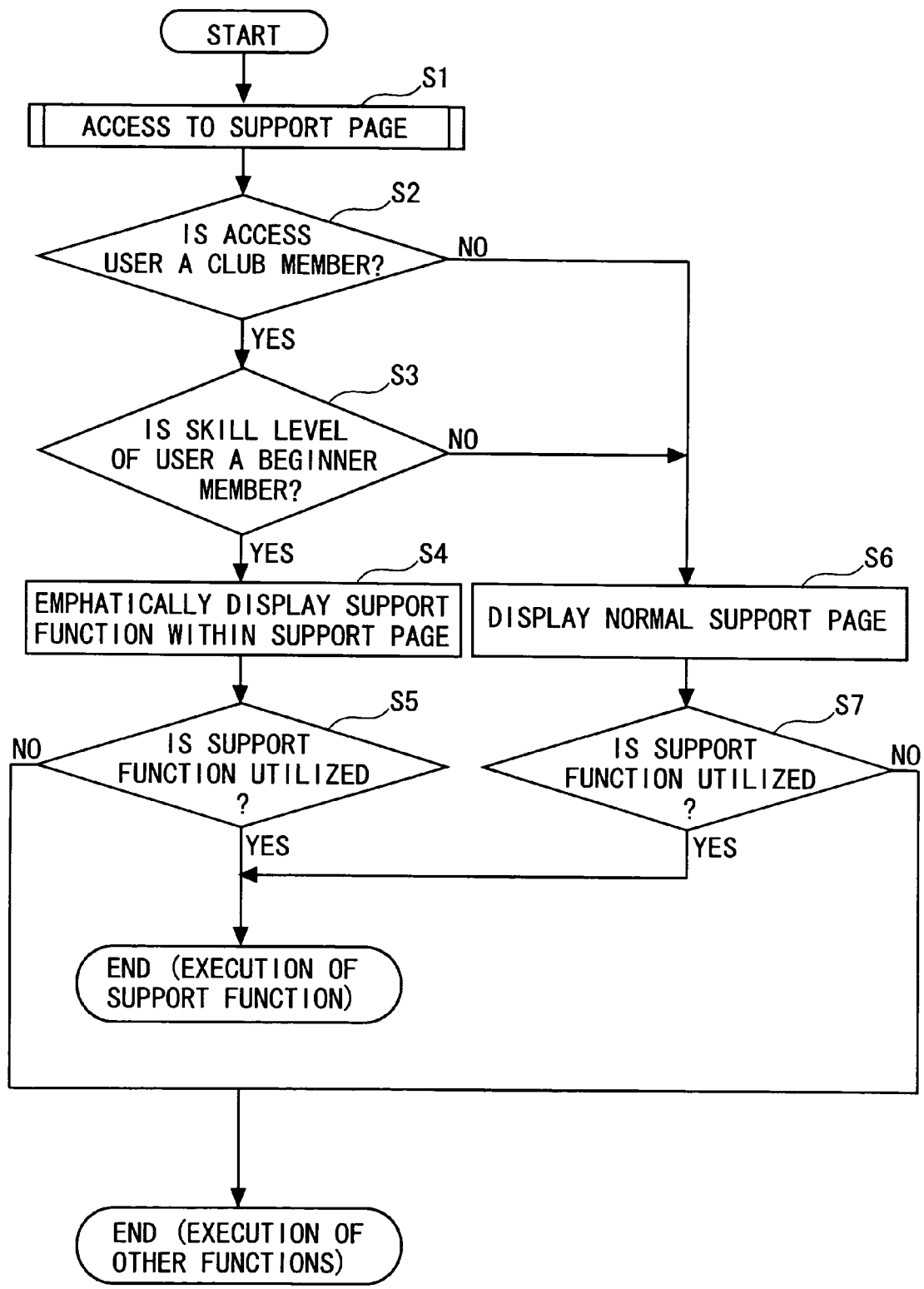
FIG. 3 is a first flowchart showing processes of the server according to the embodiment of the present invention.

FIG. 3 is a flowchart showing processes of the CPU 1 when the user accesses the CPU 1 via the Internet 8 and the communication IF 3 by use of the PC 10. The following processes are executed in a way that the CPU 1 executes a program preinstalled in the hard disc 110. This program is described in JavaScript (registered trademark), and JSP (JavaServer Pages) (registered trademark) is used as a program execution platform.

The user accesses the support page for the PC user, which is provided in the server 100. The CPU 1 of the server 100 transmits, to the PC 10, data for displaying the support page via the communication IF 3 and the Internet 8 (S1). The PC 10, when receiving the data containing the support page via the communication IF 3 and the Internet 8 from the CPU 1, gets the support page displayed on the display 9 connecting to the PC 10.

Figure 4:
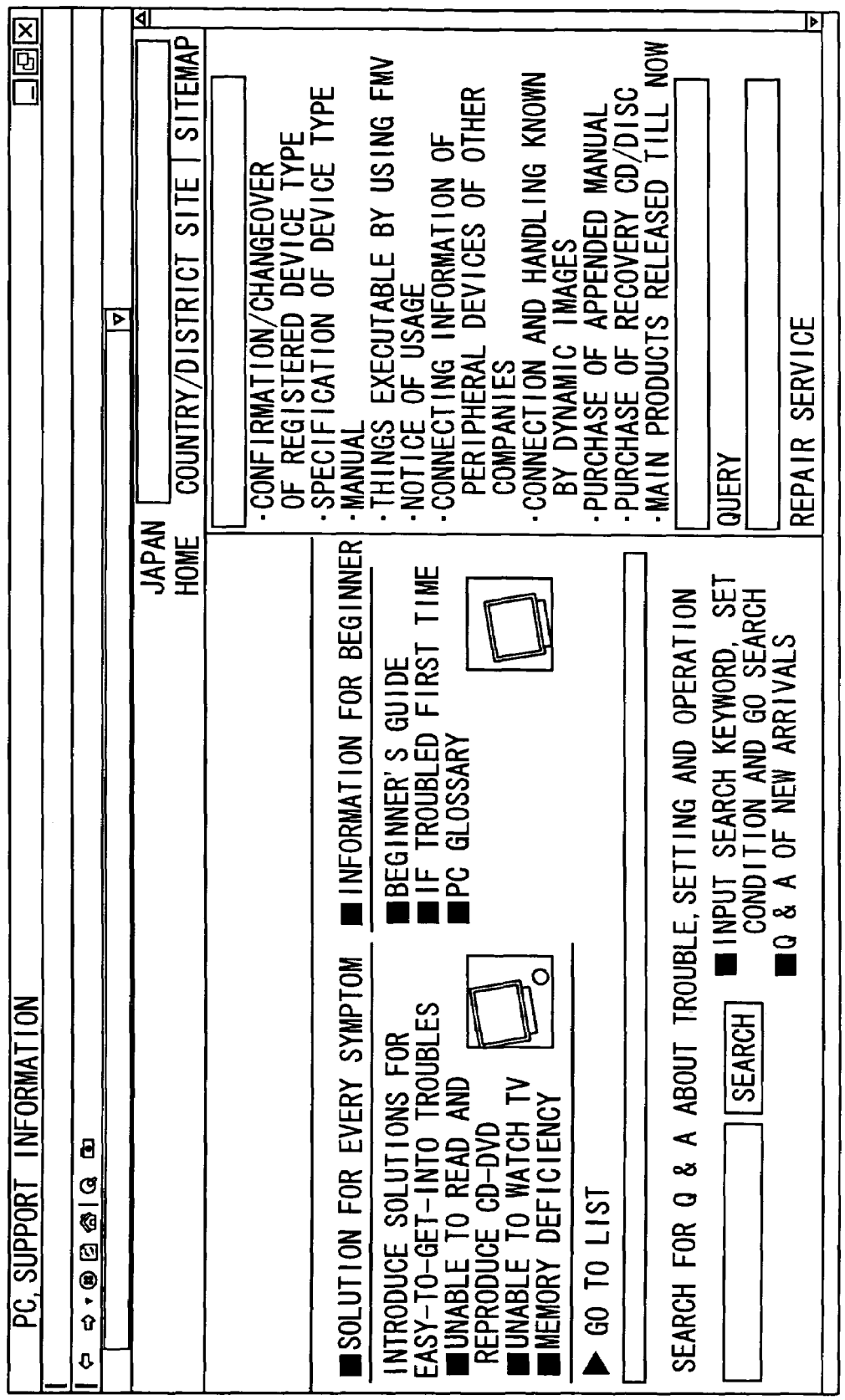
FIG. 4 is a diagram showing a first example of a support page according to the embodiment of the present invention.

FIG. 4 shows a first example of the support page according to the embodiment of the present invention. FIG. 4 shows an example of the screen when the PC 10, through the process in step S1, receives the data for displaying the support page in the first example from the server 100 and displays this support page on the display 9 connecting to the PC 10. In FIG. 4, a list of various categories of services (functions) is displayed. Shown is, for example, a service for troubles such as "unable to read and reproduce CD-DVD", "unable to watch TV", "memory deficiency", and so on.

Next, on the support page, the CPU 1 of the server 100 queries the user of the PC 10 about whether the access user (accessor) is a club member or not (S2). In this query, to start with, the CPU 1 judges whether or not a Cookie showing identification of being the club member is stored in the Browser employed by the PC 10. Then, when the Cookie is stored in the Browser provided in the PC 10, the CPU 1 reads, from this Cookie, the membership ID and the password associated with the membership ID that are contained in the Cookie. Further, the CPU 1 reads the password associated with the membership ID from the club member information table 4. The CPU 1 judges from these two passwords whether the user is the member or not.

Namely, the CPU 1 compares these two passwords and, when judging that these two passwords are identical with each other (S2; YES), proceeds with the processing to step S3. In this case, the user is judged to the club member. The CPU 1 compares these two passwords and, when judging that these two passwords are not identical, judges that the Browser of the PC 10 has none of the Cookie.

Considered is a case in which the CPU 1 judges that the Browser of the PC 10 is not stored with the Cookie containing the membership ID and the password associated with the membership ID. In this case, the CPU 1 displays, on the display 9, the Web content including a button used for notifying that the user is not the club member and an input area for inputting the club membership ID and the password associated with the membership ID in order to judge whether the user of the PC 10 is the club member or not. When the button indicating that the PC user is not the club member is pressed on the Web content by a user's operation, the CPU 1 judges that the PC user is not the club member (S2; NO), and proceeds with the processing to step S6. The CPU 1, when receiving the membership ID and the password associated with the membership ID as the club member by the operation of the user of the PC 10, reads the password associated with the membership ID inputted by the user of the PC 10 from the club member information table 4. The CPU 1 judges from these two passwords whether the user is the member or not.

The CPU 1 compares these two passwords and, when these two passwords are identical with each other (S2; YES), generates a Cookie containing the membership ID and the password inputted from the PC 10. Then, the CPU 1 registers the thus-generated Cookie in the Browser of the PC 10 and proceeds with the processing to step S3. The CPU 1 compares with these two passwords and, when judging that these two passwords are not identical (S2; NO), proceeds with the processing to step S6. In this case, the CPU 1 judges that the access user is not the club member.

In the process in step S3, the CPU 1 reads the skill level corresponding to the membership ID from the club member information/skill-level link table 7. The club member information/skill-level link table 7 is stored with numerals 1 through 3 are stored as the skill levels. The meaning of the skill level is that the skill level "1" represents the beginner member, the skill level "2" represents the intermediate-grade member, and the skill level "3" represents the high-grade member. The CPU 1 judges from the thus-read skill level whether the skill level of the user represents the beginner member or not, i.e., whether the skill level is 1 or not (S3). The CPU 1, when judging that the skill level of the user is 1 (S3; YES), proceeds with the processing to step S4. The CPU 1, when judging that the skill level of the user is other than 1 (S3; NO), proceeds with the processing to step S6.

In a process in step S4, the CPU 1 displays, on the display 9, the Web content that accepts selection of the support function exemplifying the present invention or any one of functions excluding the support function by use of the keyboard 11 or the mouse 12. In this Web content, the CPU 1 emphasizes the support function on the support page by enlarging a character in the area indicating the support function, making conspicuous a character color in the area indicating the support function (S4), thus guiding the beginner to utilize the support function. After the process in step S4, the CPU 1 proceeds to step S5.

In a process in step S5, the CPU 1 accepts an input of the keyboard 11 or the mouse 12 from the user of the PC 10. Then, the CPU 1, when judging from the input given from the user of the PC 10 that the support function is utilized (S5; YES), executes the support function. Further, the CPU 1, when judging from the input given from the user of the PC 10 that the functions other than the support function are utilized (S5; NO), executes other functions.

The process in step S6 includes a process for users excluding the members. Such being the case, the CPU 1, by contrast with the process in step S4, displays the Web content that accepts the selection of the support function or any one of the functions excluding the support function by use of the keyboard 11 or the mouse 12 without emphasizing the support function (S6). After the process in step S6, the CPU 1 proceeds with the processing to step S7.

In a process in step S7, the CPU 1 accepts the input of the keyboard 11 or the mouse 12 from the user of the PC 10. Then, the CPU 1, when judging from the input given from the user of the PC 10 that the support function is utilized (S7; YES), executes the support function. Further, the CPU 1, when judging from the input given from the user of the PC 10 that the support function is not utilized (S7; NO), executes other functions.

Further, even when the user of the PC 10 is not the member of this club, the user of the PC 10 can utilize this support function by making the PC 10 execute the processes in steps S2, S6 and S7. Therefore, the user is able to utilize the support function for making use of the guidance for the PC usage method and the guidance for obviating (troubleshooting) the abnormality (trouble) of the PC as a supporting object by getting a PC other than the supporting object PC to execute the processes in steps S2, S6 and S7.

<Second Flowchart Showing Processes of Server>

Figure 5:
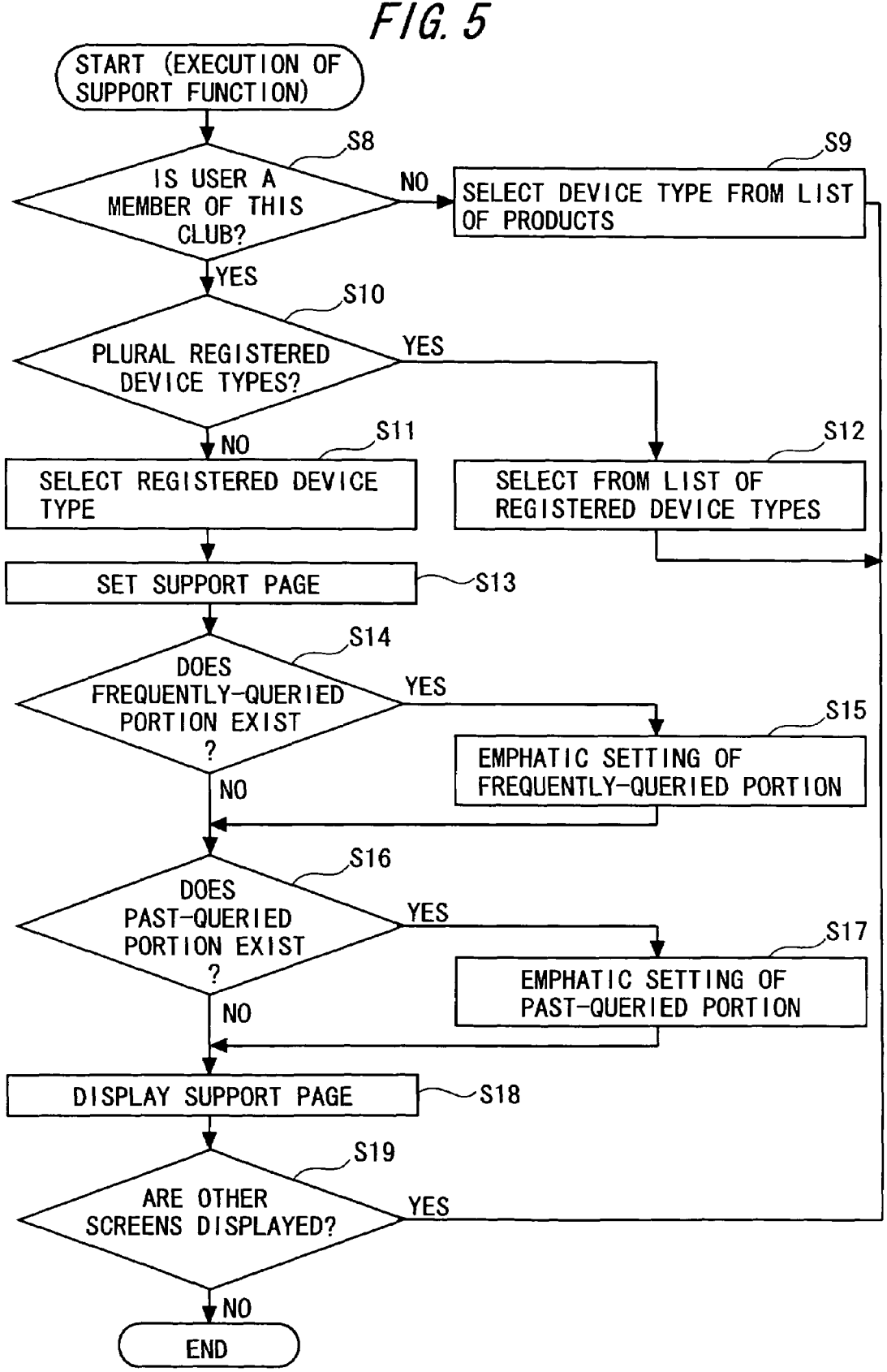
FIG. 5 is a second flowchart showing the processes of the server according to the embodiment of the present invention.

FIG. 5 is a flowchart showing processes of the CPU 1 when the user accesses the CPU 1 and utilizes the support function as the working example of the present invention via the Internet 8 and the communication IF 3 by use of the PC 10. The following processes are executed in a way that the CPU 1 executes a program preinstalled in the hard disc 110. This program is described in JavaScript (registered trademark), and JSP (JavaServer Pages) (registered trademark) is used as a program execution platform.

In a process in step S8, the CPU 1 judges whether or not the Browser of the PC 10 is stored with the Cookie showing the identification of being the member of this club, i.e., the Cookie containing the club membership ID and the password associated with the membership ID. The CPU 1, when judging that the Browser of the PC 10 is not stored with the Cookie showing the identification of being the member of this club (S8; NO), proceeds with the processing to step S9. The CPU 1, when judging that the Browser of the PC 10 is stored with the Cookie showing the identification of being the member of this club, reads the password associated with the membership ID from the club member information table 4. The CPU 1 compares the password read from the club member information table 4 with the password contained in the Cookie, thereby judging whether these two passwords are identical or not. The CPU 1, when judging that these two passwords are identical, judges the user to be the club member (S8; YES) and proceeds with the processing to step S10. The CPU 1, when judging that these two passwords are not identical, judges the user not to be the club member (S8; NO) and proceeds with the processing to step S9.

In a process in step S9, the CPU 1 reads an image of the supporting object PC and a device type ID matching with the device type of the supporting object PC from the device type information/image information link table 6. The CPU 1 displays, on the display 9, the Web content set so that the user is able to select one of these PC images by employing the keyboard 11 or the mouse 12. In the Web content, the PC image is associated with the device type ID matching with the device type of the PC in an invisible mode to the user (the device type ID may, however, be displayed in a visible mode to the user. This is hereinafter the same). Then, when the user selects one of the PC images, the device type ID associated with the selected PC image is transmitted to the CPU 1 from the PC 10. The CPU 1 receives the device type ID associated with the selected PC image from the PC 10 (S9). After the process in step S9, the CPU 1 proceeds with the processing to step S13.

In a process in step S10, the CPU 1, at first, reads the device type ID associated with the membership ID from the club member information/owner's device type link table 5. Next, the CPU 1 judges from the thus-read device type ID whether or not there is a plurality of already-registered device types (registered device types) (S10). The CPU 1, when judging from the number of read device type IDs (device type ID count) that there is the plurality of registered device types (S10; YES), proceeds with the processing to step S12. The CPU 1, when judging from the read device type ID count that there is a single registered device type (S10; NO), proceeds with the processing to step S11.

In a process in step S11, the CPU 1 reads the device type (registered device type) associated with the read device type ID from the device type information/image information link table 6. The CPU 1 displays, on the display 9, the Web content set so that the user is able to select this PC device type by employing the keyboard 11 or the mouse 12. In the Web content, the PC image is associated with the device type ID matching with the device type of the PC in an invisible mode to the user. In a process in step S11, the (single) PC image is displayed as the registered PC. The setting in the Web content is that this PC is selected by the user. When the user selects this PC, the device type ID of the selected PC is transmitted to the CPU 1 from the PC 10. The CPU 1 receives the device type ID matching with the selected PC from the PC 10 (S11). After the process in step S11, the CPU 1 proceeds with the processing to step S13.

In a process in step S12, the CPU 1 reads an image of the device type (registered device type) of the PC matching with the read device type ID from the device type information/image information link table 6. The CPU 1 displays, on the display 9, the Web content (containing the plurality of PC images) set so that one of the PC device types can be selected by using the keyboard 11 or the mouse 12. In this Web content, the PC image is associated with the device type ID matching with the device type of the PC in an invisible mode to the user. When the user selects one of the PCs, the selected device type ID of the selected PC is transmitted to the CPU 1 from the PC 10. The CPU 1 receives the device type ID matching with the selected PC from the PC 10 (S12). After the process in step S12, the CPU 1 proceeds with the processing to step S13.

In step S9, step S11, or step S12, the CPU 1 receiving the device type ID from the user of the PC 10 corresponds to an "identifying information receiving unit" according to the present invention. Further, the device type ID corresponds to "identifying information" according to the present invention.

Figure 6:
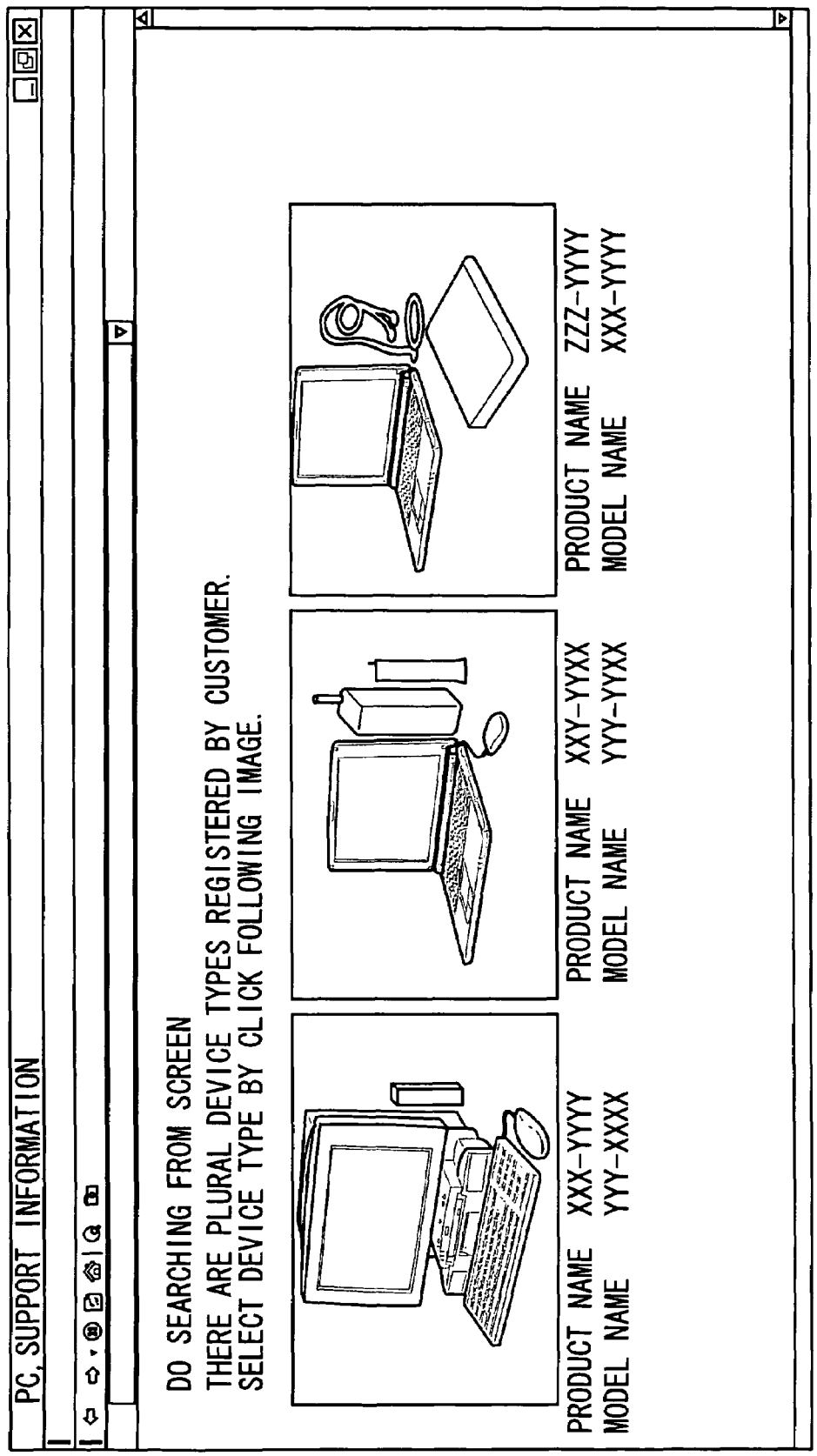
FIG. 6 is a diagram showing a second example of the support page according to the embodiment of the present invention.

FIG. 6 shows a second example of the support page according the embodiment of the present invention. FIG. 6 shows a case, wherein the PC 10, through the process in step S12, receives the data containing the support page in the second example from the CPU 1. Moreover, FIG. 6 illustrates the screen displayed on the display 9 when the CPU 1 displays the support page on the display 9 connecting to the PC 10.

FIG. 6 shows the support page set so that the CPU 1 reads images of the external configurations of the PCs, which match with the read device type ID, from the device type information/image information link table 6 and so that the user can selects one of the PCs by employing the keyboard 11 or the mouse 12 from the list of these images. Then, in the support page shown in FIG. 6, the input is accepted from the user of the PC 10. FIG. 6 shows the images of three device types of the PCs. The user selects one of these three images, i.e., one of the three PCs displayed thereon by use of the keyboard 11 or the mouse 12.

In the process in step S13, the CPU 1 reads the image file and the coordinate information associated with this image file from the device type information/image information link table 6 by using the device type ID received from the PC 10. The CPU 1 executing the process in step S13 immediately after the process in step S9, step S11, or step S12 corresponds to an "image information reading unit" according to the present invention. The CPU 1 executing the process in step S13 immediately after the process in step S19 corresponds to a "control unit" according to the present invention. The CPU 1 registers, in the memory 2, the thus-read image file and the coordinate information by way of the display setting of the support page (S13). The CPU 1 registering, in the memory 2, the thus-read image file and the coordinate information by way of the display setting of the support page, corresponds to a "creating unit" according to the present invention. After the process in step S13, the CPU 1 proceeds with the processing to step S14.

In a process in step S14, the CPU 1 judges whether or not a predetermined or larger number of queries about the individual portions of the PC are given to the support center (unillustrated) from the user of the PC 10 and from the members other than the user of the PC 10. Namely, it is judged whether or not there exists the portion about which the query is frequently made (S14). The CPU 1 reads, from the device type information/image information link table 6, a flag showing whether or not the predetermined or larger number of queries about the individual portions of the PC are given to the support center (unillustrated). The CPU 1, when the read flag indicates "1", judges that the frequently queried portion exists (S14; YES), and proceeds with the processing to step S15. The CPU 1, when the read flag indicates "0", judges that the frequently queried portion does not exist (S14; NO), and proceeds with the processing to step S15. The CPU 1 executing the judgment in the process in step S14 corresponds to a "judging unit" according to the present invention.

In a process in step S15, the CPU 1 reads, from the device type information/image information link table 6, the image file showing the portion about which the queries are given from the predetermined or larger number of users, and the coordinates for disposing this image file. The CPU 1 resets the support page set in step S13 into a support page so as to emphasize the portion about which the queries are given from the predetermined or larger number of users by employing this image file and the coordinates (the CPU 1 resetting the support page corresponds to an "emphasizing unit" according to the present invention). Herein, there may also be a plurality of portions about which the queries are given from the users. After the process in step S15, the CPU 1 proceeds with the processing to step S16.

In a process in step S16, the CPU 1 judges whether or not there exists a portion about which a query was given in the past from the member having this membership ID to the support center (unillustrated) (S16). The CPU 1 reads, from the device type information/image information link table 6, a flag showing whether or not there exists the query object portion about which the query was given in the past from the member having this membership ID to the support center (unillustrated). The CPU 1, when the read flag indicates "1", judges that there exists the query object portion about which the query was given in the past (S16; YES), and proceeds with the processing to step S15. The CPU 1, when the read flag indicates "0", judges that there does not exist the query object portion about which the query was given in the past (S16; NO), and proceeds with the processing to step S17. The CPU 1 executing the judgment in the process in step S16 corresponds to a "judging unit" according to the present invention.

In a process in step S17, the CPU 1 reads, from the device type information/image information link table 6, an image file of the portion about which the query was given in the past from the user of the PC 10 and coordinates for disposing this image file. The CPU 1 resets the support page set in step S13 into a support page so as to emphasize the portion about which the query was given in the past by employing this image file and the coordinates (the CPU 1 corresponds to an "emphasizing unit" according to the present invention). There may also be a plurality of portions about which the queries were given. After the process in step S17, the CPU 1 proceeds with the processing to step S18.

In a process in step S18, the CPU 1 transmits the thus-set support page to the PC 10 via the communication IF 3 and displays the support page on the display 9. The support page set in the process in step S13 is reset by executing the process in step S15 or in step S17, or the processes in step S15 and in step S17. In the process in step S18, the CPU 1 transmits the finally set support page to the PC 10 via the communication IF 3 and displays the support page on the display 9. The CPU 1 transmitting the support page to the PC 10 via the communication IF 3 corresponds to a "transmitting unit" according to the present invention.

In a process in step S19, in a case where there exists an image to be displayed next based on the coordinate information 1 or the coordinate information 2 with respect to the image file read in the process in step S13, the CPU 1 accepts an input of the keyboard 11 or the mouse 12 (S19). If the image to be displayed next exists, the CPU 1, with a partial area being designated (S19; YES) by the keyboard 11 or the mouse 12, receives from the PC 10 the designation of the image file to be displayed next, which matches with the designated area within the image, and proceeds with the processing to step S13. The CPU 1 receiving from the PC 10 the designation of the image file to be displayed next with respect to the transmitted coordinate information, corresponds to an "image designation receiving unit" according to the present invention.

Further, the CPU 1, when part of the image to which the coordinate information is added is designated by an input from the user, may receive designated coordinates from the PC 10. In this case, the image to be displayed next may be judged by using the received coordinates and the coordinate information corresponding to the image transmitted to the PC 10. Namely, the CPU 1 obtains a partial area corresponding to (defined by) the coordinates by employing the coordinates and the coordinate information. Then, the CPU 1 acquires, from the coordinate information, a filename of the image to be displayed next corresponding to the obtained partial area. Thus, the CPU 1 may read the image file to be displayed next from the device type information/image information link table 6 (the CPU 1 reading the image file to be displayed next corresponds to a "next image determining unit" according to the present invention). After this process, the CPU 1 proceeds with the processing to step S13.

If there is no image file to be displayed next, the CPU 1 does not accept the input from the user, and the screen displayed by the process in step S19 becomes a final guidance screen, of the CPU 1, for the user of the PC 10 (S19; NO).

As described above, the CPU 1 repeats the processes in steps S13 through S18, whereby the guidance about the PC operation on the support page, e.g., the guidance for the PC usage method and guidance for obviating the abnormality of the PC are executed for the user of the PC 10.

Figure 7:
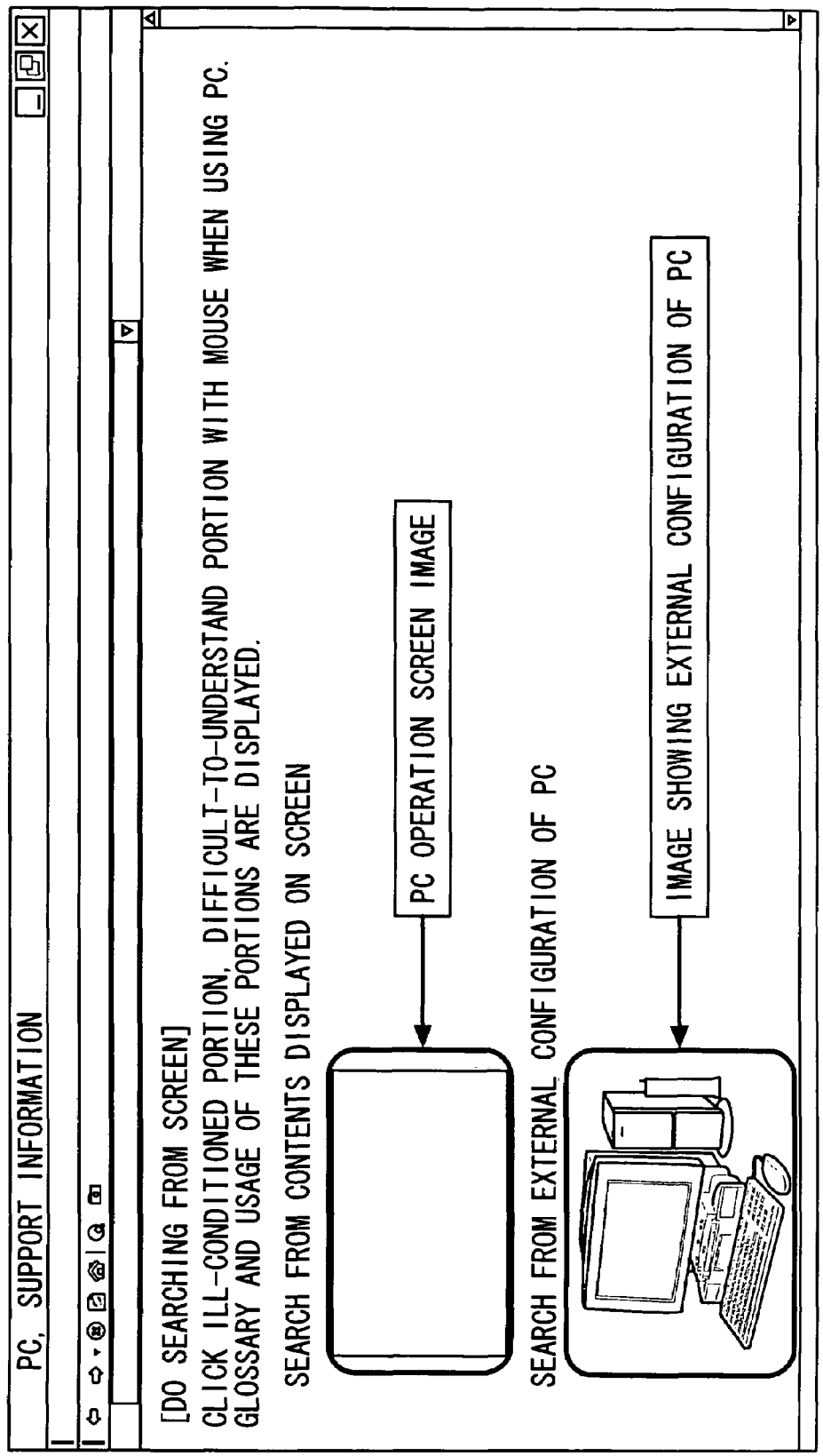
FIG. 7 is a diagram showing a third example of the support page according to the embodiment of the present invention.

FIG. 7 shows a third example of the support page according to the embodiment of the present invention. FIG. 7 illustrates a screen displayed on the display 9 when the PC 10, through the process in step S13, receives the data containing the support page in the third example from the CPU 1 and displays the support page on the display 9 connecting to the PC 10. FIG. 7 shows the screen in a case where the CPU 1 does not execute the processes in steps S15 and S17. FIG. 7 shows images ("PC operation screen image") and ("image showing the external configuration of PC") of the screens displayed on the display 9 when operating the PC 10. The support page shown in FIG. 7 is contrived so that the user selects one of these two types. Further, the coordinate information 1 stored on the hard disc 110 is used as the coordinate information for the image file of the "PC operation screen image". The coordinate information 2 stored on the hard disc 110 is used as the coordinate information for the image file of the "image showing the external configuration of PC". The user of the PC 10 selects any one of the "PC operation screen image" and the "image showing the external configuration of PC" by employing the keyboard 11 or the mouse 12, whereby the guidance for the PC usage method and for obviating the abnormality in the PC operation, or the guidance for the usage method and for obviating the abnormality in the external portion of the PC can be utilized.

Figure 8:
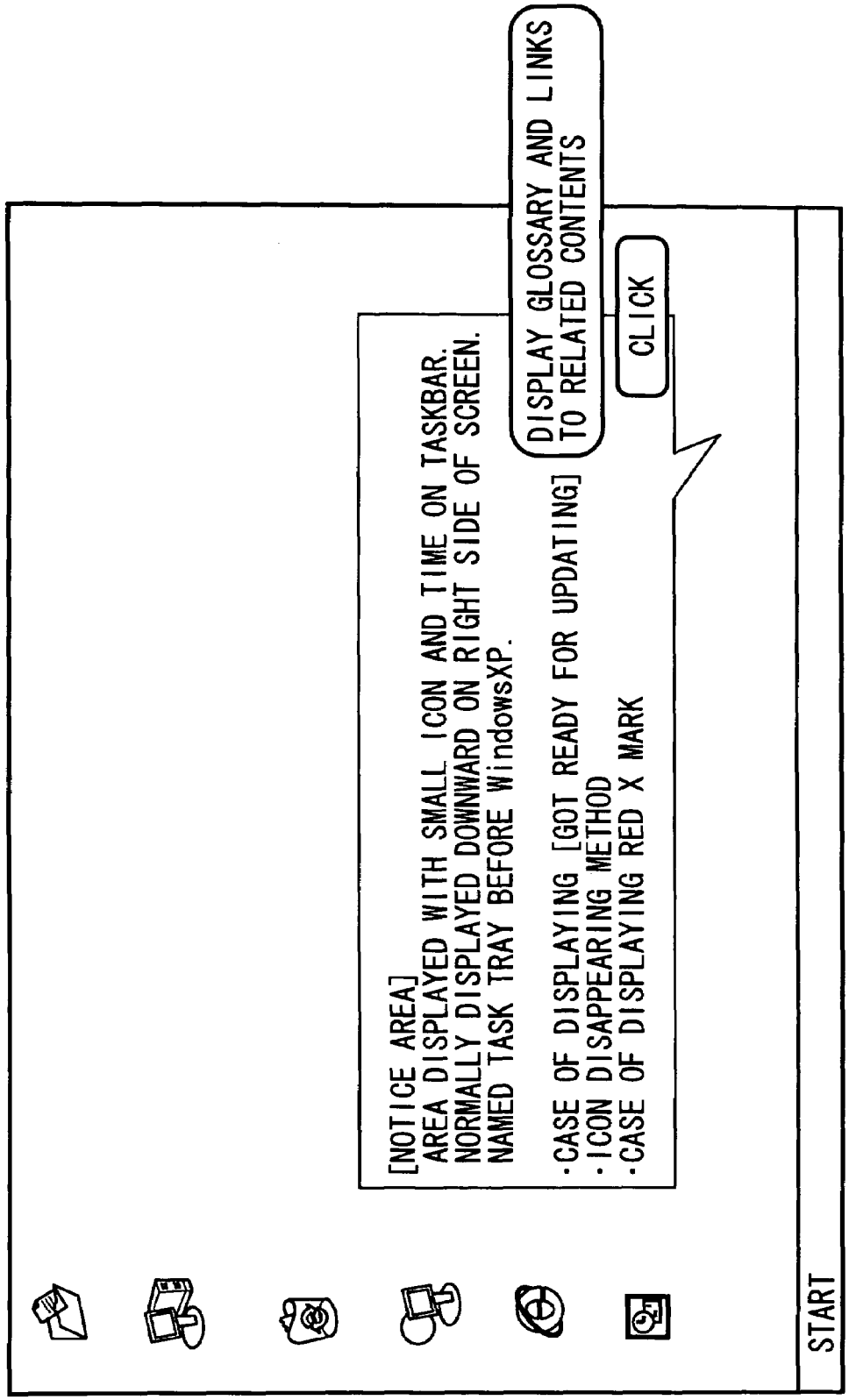
FIG. 8 is a diagram showing a fourth example of the support page according to the embodiment of the present invention.

FIG. 8 shows a fourth example of the support page according to the embodiment of the present invention. FIG. 8 illustrates a screen when the PC 10, through the process in step S13, receives the data for displaying the support page in the fourth example from the CPU 1, and the data are displayed on the display 9 connecting to the PC 10. FIG. 8 illustrates the screen in the case where the CPU 1 does not execute the processes in steps S15 and S17. FIG. 8 shows the screen in such a case that the user selects the "PC operation screen image" displayed on the screen in FIG. 7 by use of the keyboard 11 or the mouse 12, and a lower right-side portion on the screen is manipulated by employing the keyboard 11 or the mouse 12. The user of the PC 10 can thus utilize the guidance for the PC usage method and for obviating the abnormality of the PC in the PC operation.

Figure 9:
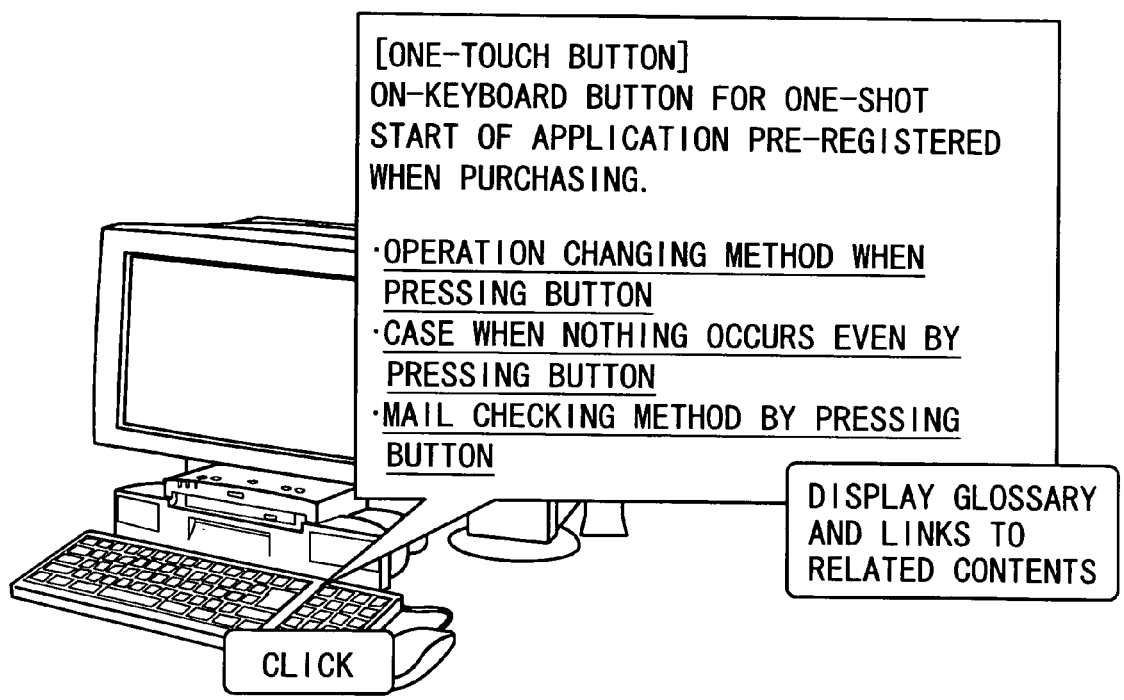
FIG. 9 is a diagram showing a fifth example of the support page according to the embodiment of the present invention.

FIG. 9 shows a fifth example of the support page according to the embodiment of the present invention. FIG. 9 illustrates a screen displayed on the display 9 when the PC 10, through the process in step S13, receives the data for displaying the support page in the fifth example from the CPU 1, and displays the support page on the display 9 connecting to the PC 10. FIG. 9 illustrates the screen in the case where the CPU 1 does not execute the processes in steps S15 and S17. FIG. 9 shows the screen in such a case that the user selects the "image showing the external configuration of PC" displayed on the screen in FIG. 7 by use of the keyboard 11 or the mouse 12, and a central lower portion on the screen is manipulated by employing the keyboard 11 or the mouse 12. The user of the PC 10 can thus utilize the guidance for the PC usage method and for obviating the abnormality of the PC in the external configuration of the PC.

Figure 10:
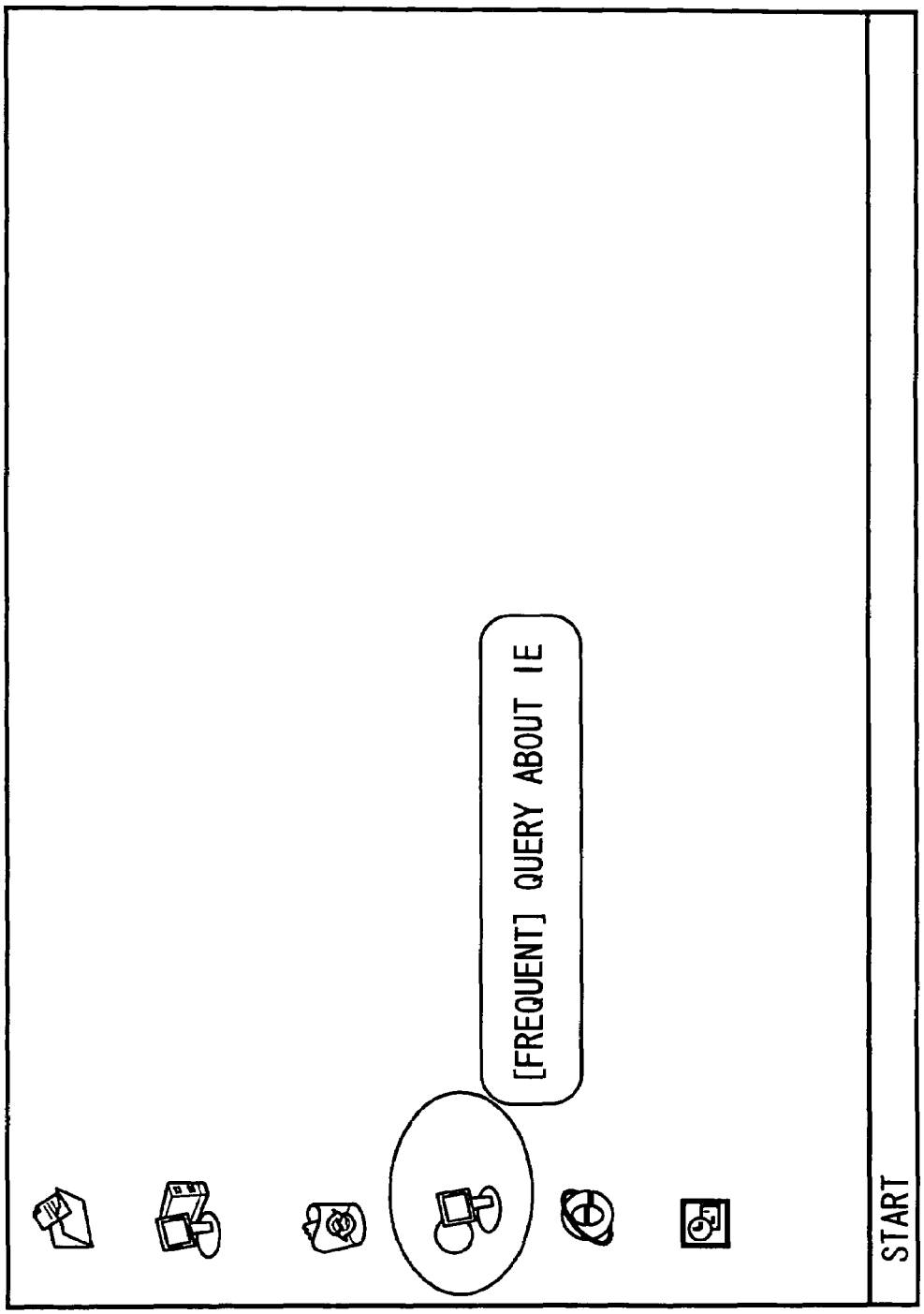
FIG. 10 is a diagram showing a sixth example of the support page according to the embodiment of the present invention.

FIG. 10 shows a sixth example of the support page according to the embodiment of the present invention. FIG. 10 illustrates a screen displayed on the display 9 when the PC 10, through the process in step S13, receives the data for displaying the support page in the sixth example from the CPU 1, and displays the support page on the display 9 connecting to the PC 10. FIG. 10 illustrates the screen in the case where the CPU 1 executes the process in step S15 but does not execute the process in step S17. FIG. 10 shows a state where the frequently-queried portion is emphasized by a circled image through the process in step S15. Thus, the frequently-queried portion is emphasized by the image, whereby the user of the PC 10 can previously pay the attention to the portion that is often questioned about the PC usage method and about obviating the abnormality of the PC.

Figure 11:
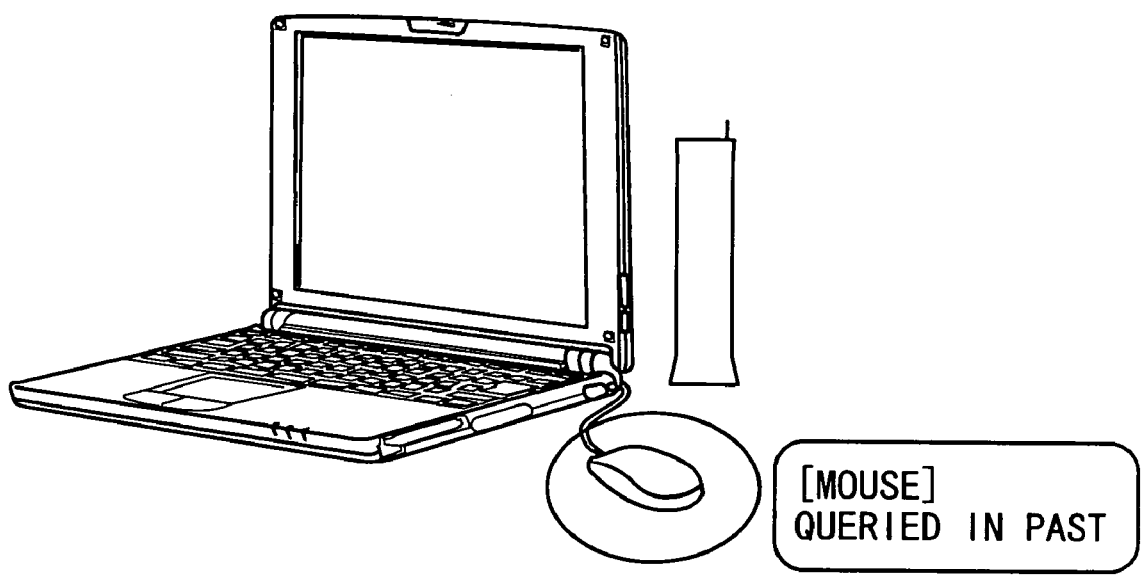
FIG. 11 is a diagram showing a seventh example of the support page according to the embodiment of the present invention.
Figure 12:
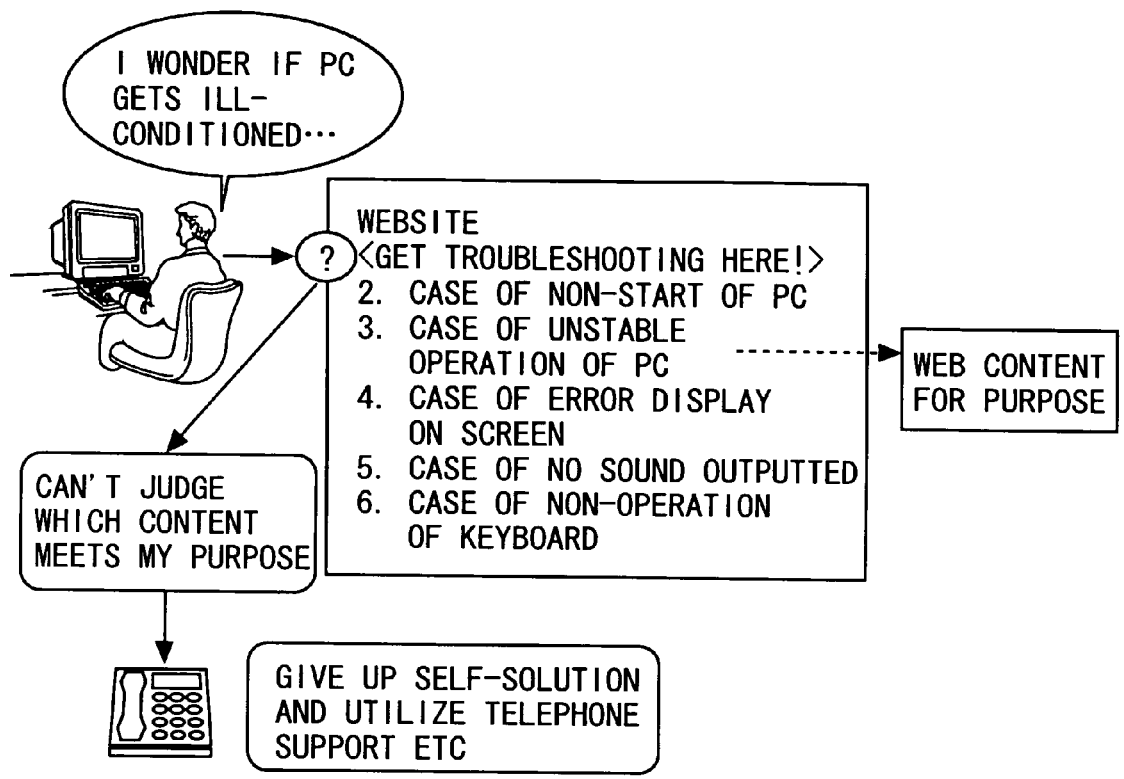
FIG. 12 is a diagram showing a first usage example of a Web content for PC support in the related art.
Figure 13:
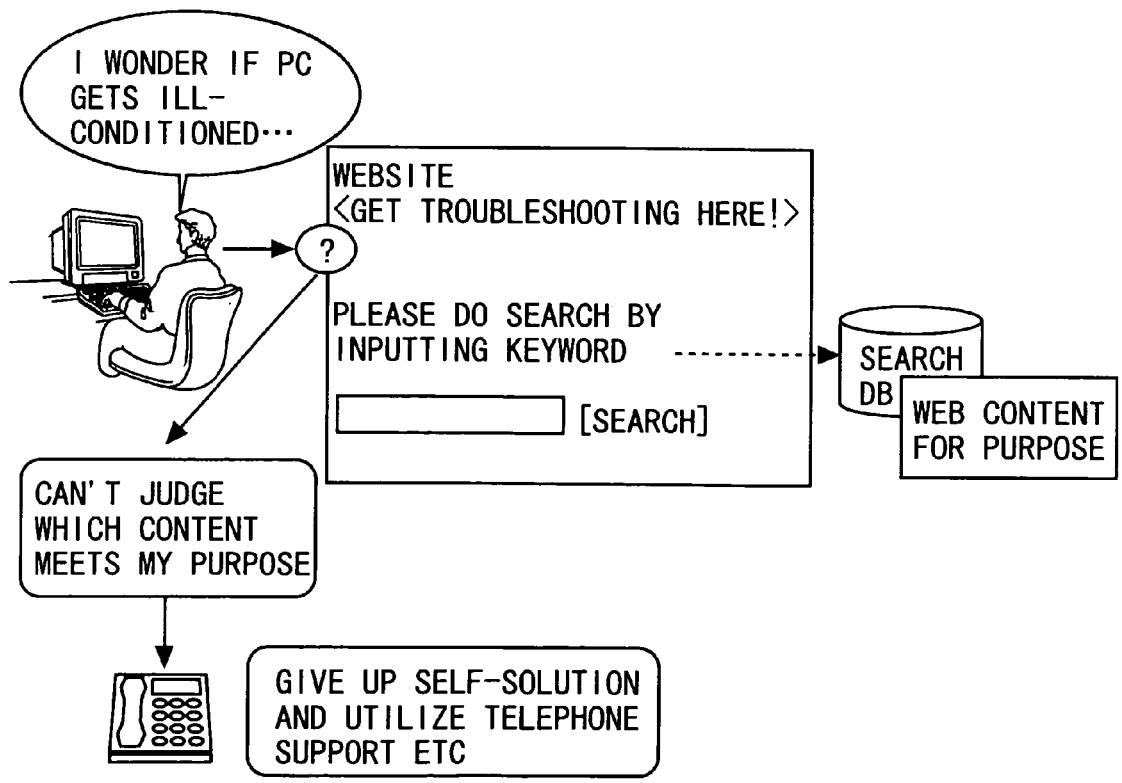
FIG. 13 is a diagram showing a second usage example of the Web content for PC support in the related art.

FIG. 11 shows a seventh example of the support page according to the embodiment of the present invention. FIG. 11 illustrates a screen displayed on the display 9 when the PC 10, through the process in step S13, receives the data containing the support page in the seventh example from the CPU 1 and displays the support page on the display 9 connecting to the PC 10. FIG. 11 illustrates the example of the screen in the case where the CPU 1 does not execute the process in step S15 but executes the process in step S17. FIG. 11 shows a state where the portion about which the user queried in the past is emphasized by a circled image through the process in step S17. Thus, the portion about which the user queried in the past is emphasized by the image, whereby the user of the PC 10 can pay the attention to the portion about which the user queried in the past.

In the way described above, the user of the PC 10 can acquire the target information by repeating the selection (click) of part of the PC-related image file displayed on the display 9, and can therefore recognize the target information without knowing the PC's terminology.

In the manner explained above, the user of the PC 10 can extract the target information by selecting the partial area within the image in a way that operates the PC 10, i.e., can receive the guidance. Accordingly, the user of the PC 10 can know the information on the PC operation without having any knowledge about the PC's terminology. The user of the PC 10 is able to extract the target information by selecting the image from the image of the external configuration of the PC 10, i.e., can receive the guidance. Hence, the user of the PC 10 is able to know the information on the external configuration of the PC without having any knowledge about the PC's terminology.

In the manner described above, the user of the PC 10 can visually recognize the frequently-queried portion and therefore can pay the attention to this point. Further, the user of the PC 10 can visually recognize the portion about which the user queried in the past and therefore can pay the attention to this portion.

In the way explained above, the user of the PC 10 can know the PC's terminology by reading the PC glossary attached to the image on the occasion of utilizing the guidance for the PC usage method and for obviating the abnormality of the PC.

<Incorporation by Reference>

The disclosures of Japanese patent application No. JP2005-362910 filed on Dec. 16, 2005 including the specification, drawings and abstract are incorporated herein by reference.

What is claimed is:

1. A guidance apparatus related to an operation of information equipment, providing guidance information on operations of the information equipment by performing mutual communications with a device, the guidance apparatus comprising:

a database containing images about the information equipment;

an identifying information receiving unit to receive the identifying information of the information equipment from the device;

an image information reading unit to read the image from the database with respect to the identifying information received by an identifying information receiving unit;

a creating unit to create guidance information containing the image read by the image information reading unit;

a transmitting unit to transmit the guidance information created by the creating unit to the device;

an image designation receiving unit to receive information determined by a manipulation about the guidance information on the device; and a control unit to control the image information reading unit to read the image used for the guidance information to be created next by the creating unit from the information received by the image designation receiving unit, wherein the guidance information further contains coordinates defined within the image and next image information that designates an image to be displayed next on the device when manipulating an image portion containing the defined coordinates, and the information received by the image designation receiving unit is information on the image to be displayed next on the device.

2. The guidance apparatus related to an operation of information equipment according to claim 1, wherein the information received by the image designation receiving unit is coordinates indicating a position within the image, the database contains coordinate information that associates the coordinates defined within the image with the next image information that designates the image to be displayed next on the device, and the guidance apparatus further comprises a next image determining unit to determine the image to be displayed next on the device from the coordinate information on the basis of the coordinates received by the image designation receiving unit.

3. The guidance apparatus related to an operation of information equipment according to claim 1, wherein the database further contains an image for emphasizing a portion about which a query is given to a support center accepting the query from the user, and coordinates for disposing the portion, and the guidance apparatus further comprises:

a judging unit to judge based on the database whether or not the guidance information created by the creating unit contains the portion about which the query is given; and an emphasizing unit to read, when the judging unit judges that there exists the portion, the image for emphasizing the portion and the coordinates for disposing the portion from the database, and to make the guidance information created by the creating unit contain the thus-read image for emphasizing and the thus-read coordinates for disposing.

4. The guidance apparatus related to an operation of information equipment according to claim 3, wherein the portion about which the query is given is the portion about which the user of the device queries.

5. The guidance apparatus related to an operation of information equipment according to claim 3, wherein the portion about which the query is given is a portion about which users other than the user of the device and the user of the device query a predetermined or larger number of times.

6. The guidance apparatus related to an operation of information equipment according to claim 1, wherein the image related to the information equipment contains an image about an external configuration of the information equipment and an explanatory image about the external configuration of the information equipment, or an image of a screen displayed on a display when operating the information equipment and an explanatory image about the screen displayed on the display when operating the information equipment.

7. The guidance apparatus related to an operation of information equipment according to claim 1, wherein the image related to the information equipment contains guidance for a usage method of the information equipment and guidance for obviating an abnormality of the information equipment, or contains images about the guidance for the usage method of the information equipment and the guidance for obviating the abnormality of the information equipment.

8. A guidance method related to an operation of information equipment, comprising:

receiving identifying information of the information equipment from a device;

reading an image from a database containing images about the information equipment with respect to the identifying information received:

creating guidance information containing the image read;

transmitting the guidance information created;

receiving determination information determined by a manipulation about the guidance information on the device; and reading the image used for the guidance information to be created next from the determination information, wherein the guidance information further contains coordinates defined within the image and next image information that designates an image to be displayed next on the device when manipulating an image portion containing the defined coordinates, and the determination information is next image information contained in the guidance information.

9. The guidance method related to an operation of information equipment according to claim 8, further comprising:

judging, based on the database further containing an image for emphasizing a portion about which a query is given to a support center accepting the query from the user and coordinates for disposing the portion, whether or not the guidance information created contains the portion about which the query is given; and reading, when judging that there exists the portion, the image for emphasizing the portion and the coordinates for disposing the portion from the database, and making the guidance information created contain the thus-read image for emphasizing and the thus-read coordinates for disposing.

10. A storage medium readable by a machine, storing a program for a guidance program related to an operation of information equipment, making a computer execute:

receiving identifying information of the information equipment from a device;

reading an image from a database containing images about the information equipment with respect to the identifying information received;

creating guidance information containing the image read;

transmitting the guidance information created to the device;

receiving determination information determined by a manipulation about the guidance information on the device; and reading the image used for the guidance information to be created next from the determination information, wherein the guidance information further contains coordinates defined within the image and next image information that designates an image to be displayed next on the device when manipulating an image portion containing the defined coordinates, and the determination information is next image information contained in the guidance information.

* * * * *

UNITED STATES PATENT AND TRADEMARK OFFICE
CERTIFICATE OF CORRECTION

PATENT NO. : 7,676,029 B2
APPLICATION NO. : 11/389142
DATED : March 9, 2010
INVENTOR(S) : Takayuki Ohashi et al.

It is certified that error appears in the above-identified patent and that said Letters Patent is hereby corrected as shown below:

Column 19, Line 3, change "received:" to --received;--.

Column 20, Lines 4-26, claim 10, change
"10. A storage medium readable by a machine, storing a program for a guidance program related to an operation of information equipment, making a computer execute:

receiving identifying information of the information equipment from a device;

reading an image from a database containing images about the information equipment with respect to the identifying information received;

creating guidance information containing the image read;

transmitting the guidance information created to the device;

receiving determination information determined by a manipulation about the guidance information on the device;

and reading the image used for the guidance information to be created next from the determination information, wherein the guidance information further contains coordinates defined within the image and next image information that designates an image to be displayed next on the device when manipulating an image portion containing the defined coordinates, and Signed and Sealed this Fifteenth Day of June, 2010

David J. Kappos
*Director of the United States Patent and Trademark Office* the determination information is next image information contained in the guidance information." to --10. A storage medium readable by a machine, storing a program for a guidance program related to an operation of information equipment, making a computer execute:

receiving identifying information of the information equipment from a device;

reading an image from a database containing images about the information equipment with respect to the identifying information received;

creating guidance information containing the image read;

transmitting the guidance information created to the device;

receiving determination information determined by a manipulation about the guidance information on the device;

and reading the image used for the guidance information to be created next from the determination information, wherein the guidance information further contains coordinates defined within the image and next image information that designates an image to be displayed next on the device when manipulating an image portion containing the defined coordinates, and the determination information is next image information contained in the guidance information.--.